United States Patent
Kazem

(10) Patent No.: US 11,205,294 B1
(45) Date of Patent: Dec. 21, 2021

(54) COMPUTER-IMPLEMENTED OPTIMIZATION OF ANIMATION SPEED AND SPATIAL ASPECTS OF VISUALIZED TEMPORAL DATA

(71) Applicant: International Business Machines Corporation, Armonk, NY (US)

(72) Inventor: Firas Kazem, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/991,000

(22) Filed: Aug. 11, 2020

(51) Int. Cl.
  *G06T 13/80* (2011.01)
  *G06F 16/9537* (2019.01)
  *G06F 16/29* (2019.01)

(52) U.S. Cl.
  CPC ............. *G06T 13/80* (2013.01); *G06F 16/29* (2019.01); *G06F 16/9537* (2019.01)

(58) Field of Classification Search
  None
  See application file for complete search history.

(56) References Cited

U.S. PATENT DOCUMENTS

| | | | |
|---|---|---|---|
| 8,146,009 B2 | 3/2012 | Mason | |
| 8,872,846 B2 | 10/2014 | Kew | |
| 9,881,396 B2 | 1/2018 | Ruble | |
| 10,198,485 B2 | 2/2019 | Parker | |
| 10,209,079 B2 | 2/2019 | Higgins | |
| 2007/0174770 A1 | 7/2007 | Safoutin | |
| 2008/0228388 A1* | 9/2008 | Tauchi | G01C 21/36 701/533 |
| 2008/0307345 A1* | 12/2008 | Hart | G06F 11/1448 715/769 |
| 2011/0255845 A1* | 10/2011 | Kikuchi | H04N 21/4325 386/278 |
| 2012/0144335 A1 | 6/2012 | Abeln | |
| 2017/0097963 A1 | 4/2017 | Galloway | |
| 2021/0160435 A1* | 5/2021 | Pena | H04N 5/2621 |

OTHER PUBLICATIONS

Mell et al., "The NIST Definition of Cloud Computing", National Institute of Standards and Technology, Special Publication 800-145, Sep. 2011, 7 pages.

* cited by examiner

*Primary Examiner* — Jeffrey J Chow
(74) *Attorney, Agent, or Firm* — Michael A. Petrocelli

(57) ABSTRACT

An adaptive map is generated using a computer, for visualizing data with temporal relationships. The computer receives data comprising temporal data values and assigns to each temporal data value, a visual attribute corresponding to the temporal data value to generate a set of temporal visualized outputs. The computer determines temporal differences in the set of temporal visualized outputs and assigns a temporal animation playback speed to of the temporal data values. The temporal animation playback speed is a first speed if said temporal difference equals or exceeds a predetermined change threshold, and the temporal animation playback speed is a second speed if said temporal difference is below a predetermined change threshold. The computer displays the temporal visualized outputs at said corresponding animation playback speeds on a map display.

20 Claims, 7 Drawing Sheets

| Quantity | Country | Year | Zoom Level | Total animation time | Zoom animation Time | Notes |
|---|---|---|---|---|---|---|
| 5 10 | Italy Germany | 2015 | Z0 | 1 | 0 | No change |
| 5 10 | Italy Germany | 2016 | Z0 | 1 | 0 | No change |
| 5 10 | Italy Germany | 2017 | Z0 | 2 | 1 | Upcoming change in zoom level |
| 5 10 30 | Italy Germany Portugal | 2018 | Z1 | 4 | 2 | Upcoming change in zoom level |
| 5 10 30 10 | Italy Germany Portugal Canada | 2019 | Z2 | 2 | 0 | Addition of new countries |

402

| Id | Quantity | Country | Year | Animation Time (in seconds) |
|---|---|---|---|---|
| 1 | 5 | France | 2015 | 05 |
| 2 | 10 | Germany | 2015 | 0.5 |
| 3 | 5 | France | 2016 | 1 |
| 4 | 10 | Germany | 2016 | 1 |
| 5 | 5 | France | 2017 | 1.5 |
| 6 | 12 | Germany | 2017 | 1.5 |
| 8 | 5 | France | 2018 | 3 |
| 9 | 20 | Germany | 2018 | 3 |
| 10 | 30 | Italy | 2018 | 3 |
| 11 | 5 | France | 2019 | 5 |
| 12 | 20 | Germany | 2019 | 5 |
| 13 | 1 | Canada | 2019 | 5 |

— 300

FIG. 3A

| Year | Time (seconds) | Description |
|---|---|---|
| 2015 | 0.5 | No data change next year |
| 2016 | 1 | No change since previous year |
| 2017 | 1.5 | Slight data change since previous year |
| 2018 | 3 | Significant change in data with an addition of a location in the same zoom level |
| 2019 | 5 | Small change in data but an introduction of a new location requiring a different zoom level |

— 302

FIG. 3B

| Quantity | Country | Color | Shape |
|---|---|---|---|
| 25 | France | Medium Blue | Circle |
| 62 | Germany | Dark Blue | Square |
| 30 | Italy | Medium Blue | Circle |
| 1 | Canada | Light Blue | Triangle |

| Quantity | Country | Year | Zoom Level | Total animation time | Zoom animation Time | Notes |
|---|---|---|---|---|---|---|
| 5<br>10 | Italy<br>Germany | 2015 | Z0 | 1 | 0 | No change |
| 5<br>10 | Italy<br>Germany | 2016 | Z0 | 1 | 0 | No change |
| 5<br>10 | Italy<br>Germany | 2017 | Z0 | 2 | 1 | Upcoming change in zoom level |
| 5<br>10<br>30 | Italy<br>Germany<br>Portugal | 2018 | Z1 | 4 | 2 | Upcoming change in zoom level |
| 5<br>10<br>30<br>10 | Italy<br>Germany<br>Portugal<br>Canada | 2019 | Z2 | 2 | 0 | Addition of new countries |

COMPUTER-IMPLEMENTED OPTIMIZATION OF ANIMATION SPEED AND SPATIAL ASPECTS OF VISUALIZED TEMPORAL DATA

BACKGROUND

The present invention relates generally to the field of computer generated, adaptive map displays, and more specifically, to computerized optimization of the display properties for a map for temporal relationships.

Maps can be used to show sets of data with spatial and temporal attributes. This kind of data may be visualized on an animated map that shows data changing with time across a geography. The timeline animation speed is fixed and is selected in proportion to the number of distinct data points present during the time covered. Each data point is displayed for the same duration.

SUMMARY

According to one embodiment of the invention, a computer-implemented method for generating an adaptive map for visualizing data with temporal relationships includes receiving, by a computer, data that includes temporal data values. The computer assigns one of several corresponding visual attributes to each temporal data value and generates a set of temporal visualized outputs. The computer determines temporal differences in said set of temporal visualized outputs and assigns a corresponding a temporal animation playback speed to each of said temporal data values. The temporal animation playback speed is a first speed if the temporal difference equals or exceeds a predetermined change threshold and a second speed if said temporal difference is below a predetermined change threshold. The computer displays the temporal visualized outputs at the corresponding animation playback speeds on a map display. In other aspects of the invention, the temporal data values can include temporal zoom level information, and when the computer determines that temporal differences include a zoom level change, the computer will calculate a temporal zoom transition factor and will modifying the animation playback speed in accordance with the temporal zoom transition factor. In other aspects of the invention, the zoom magnitude factor is a change in overall geography represented by the map or a change in centroid of area represented by the map. In other aspects of the invention, the computer adjusts, in response to receiving an interest-indicating interaction of a user, a temporal scale to focus on an area of interest indicated by the interaction. In other aspects of the invention, the interest-indicating interaction is a pause, a rewind, or a fast forward of map animation. In other aspects of the invention, the computer adjusts, in response to receiving an interest-indicating interaction of a user, a spatial scale to focus on an area of interest indicated by the interaction. In other aspects of the invention, the interest-indicating interaction is a change in zoom level. In other aspects of the inventions, the data includes location significance information associated with each temporal data value, and the computer modifies the animation speed in accordance with the location significance information. In other aspects of the invention, the location significance information is the area inside borders of said associated location, the regional density for said associated location, or the number of bordered regions in said associated location.

According to another embodiment of the invention, a system to generate an adaptive map for visualizing data with temporal relationships, comprises: a computer system comprising a computer readable storage medium having program instructions embodied therewith, the program instructions executable by a computer to cause the computer to: receive data comprising temporal data values; assign to each temporal data value one of a plurality of visual attributes that corresponds to said temporal data value, thereby generating a set of temporal visualized outputs; determine temporal differences in said set of temporal visualized outputs; assign, responsive to said calculation of temporal differences, a temporal animation playback speed to each of said temporal data values, wherein said temporal animation playback speed is a first speed if said temporal difference equals or exceeds a predetermined change threshold, and wherein said temporal animation playback speed is a second speed if said temporal difference is below a predetermined change threshold; and display said temporal visualized outputs at said corresponding animation playback speeds on a map display.

According to another embodiment of the invention, a computer program product generates an adaptive map for visualizing data with temporal relationships, the computer program product comprising a computer readable storage medium having program instructions embodied therewith, the program instructions executable by a computer to cause the computer to: receive, using the computer, data comprising temporal data values; assign, using the computer, to each temporal data value one of a plurality of visual attributes that corresponds to said temporal data value, thereby generating a set of temporal visualized outputs; determine, using the computer, temporal differences in said set of temporal visualized outputs; assign, using the computer, responsive to said calculation of temporal differences, a temporal animation playback speed to each of said temporal data values, wherein said temporal animation playback speed is a first speed if said temporal difference equals or exceeds a predetermined change threshold, and wherein said temporal animation playback speed is a second speed if said temporal difference is below a predetermined change threshold; and display, using the computer, said temporal visualized outputs at said corresponding animation playback speeds on a map display.

The present disclosure recognizes the shortcomings and problems associated with fixed-scale temporal maps. In some aspects of the present invention, map visualization animation speed is selected in accordance with the data for a specific temporal value; the map animation speed is adjusted to increase display time for temporal data points where there is a significant change in the visualized data from the previous state. According to some aspects of the invention, the map will adjust a zoom display level gradually in anticipation of changes in the visualized data of a new temporal data point. According to other aspects of the invention, user interaction may also affect spatial and temporal aspects of the animated display. In one embodiment, a map with a timeline will adjust the speed in which it switches between different temporal values based on the changes in the visualized data. If the changes in the data will result in a significant detectable change in what is visualized, the map will spend more time on that temporal value, and the playback animation will be at a first speed. If the changes in the data will not result in a significant detectable change in what is visualized, the map will spend less time on that temporal value, and the playback animation will be at a second speed. The first animation speed is slower than the second animation speed. In addition, the map will slowly transition the zoom level if upcoming changes in the data require it.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 3A is a table showing sample animation times selected in accordance with aspects of the present invention.

FIG. 3B is a is a table showing sample criteria for selecting animation speed according to aspects of the present invention.

FIG. 4A is a table showing possible visualized output options selected in accordance with aspects of the present invention.

FIG. 4B is a table showing zoom level transition times selected in accordance with aspects of the present invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
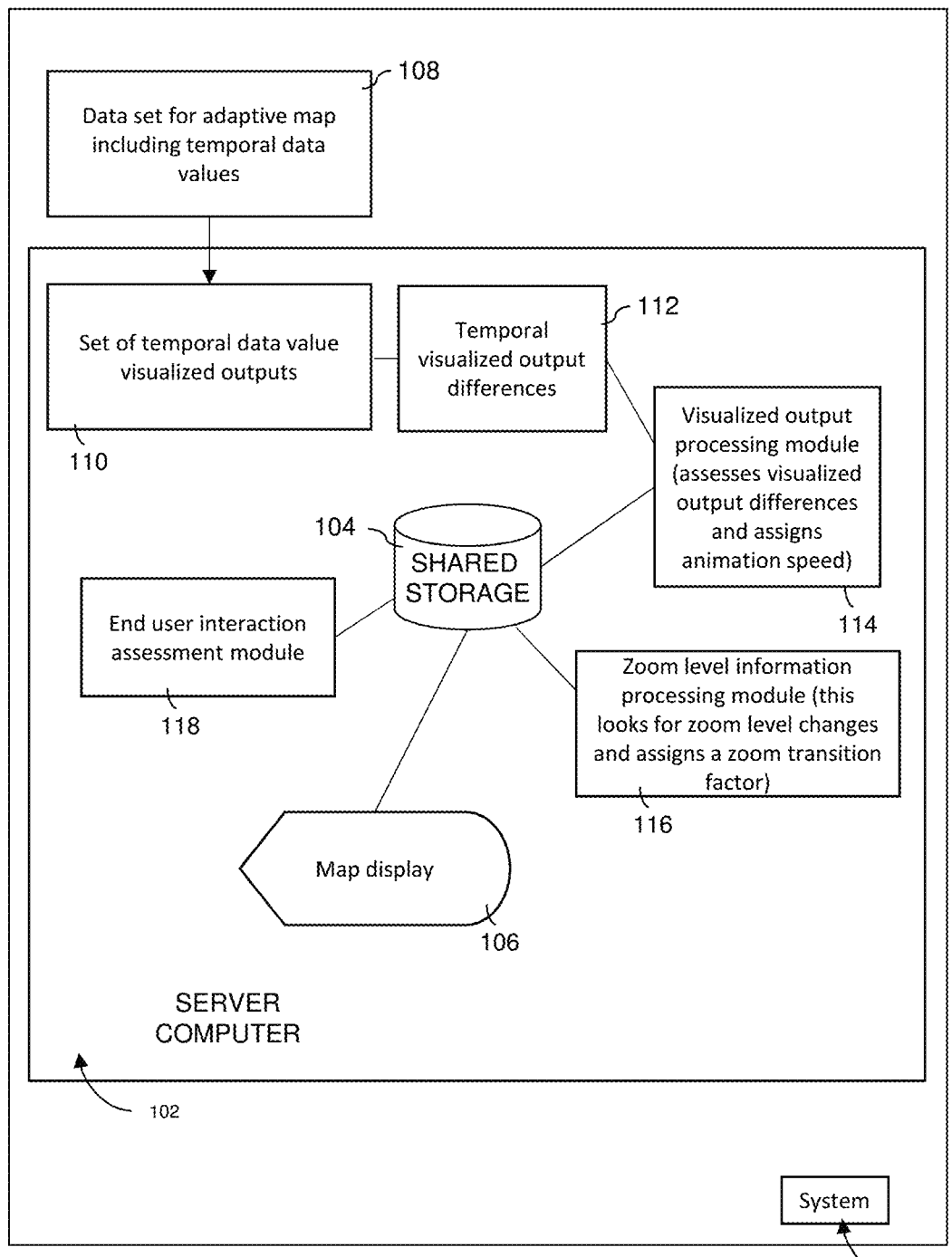
FIG. 1 is a schematic block diagram illustrating an overview of a system for computer-implemented optimization of animation speed and spatial aspects of visualized temporal data.
Figure 2:
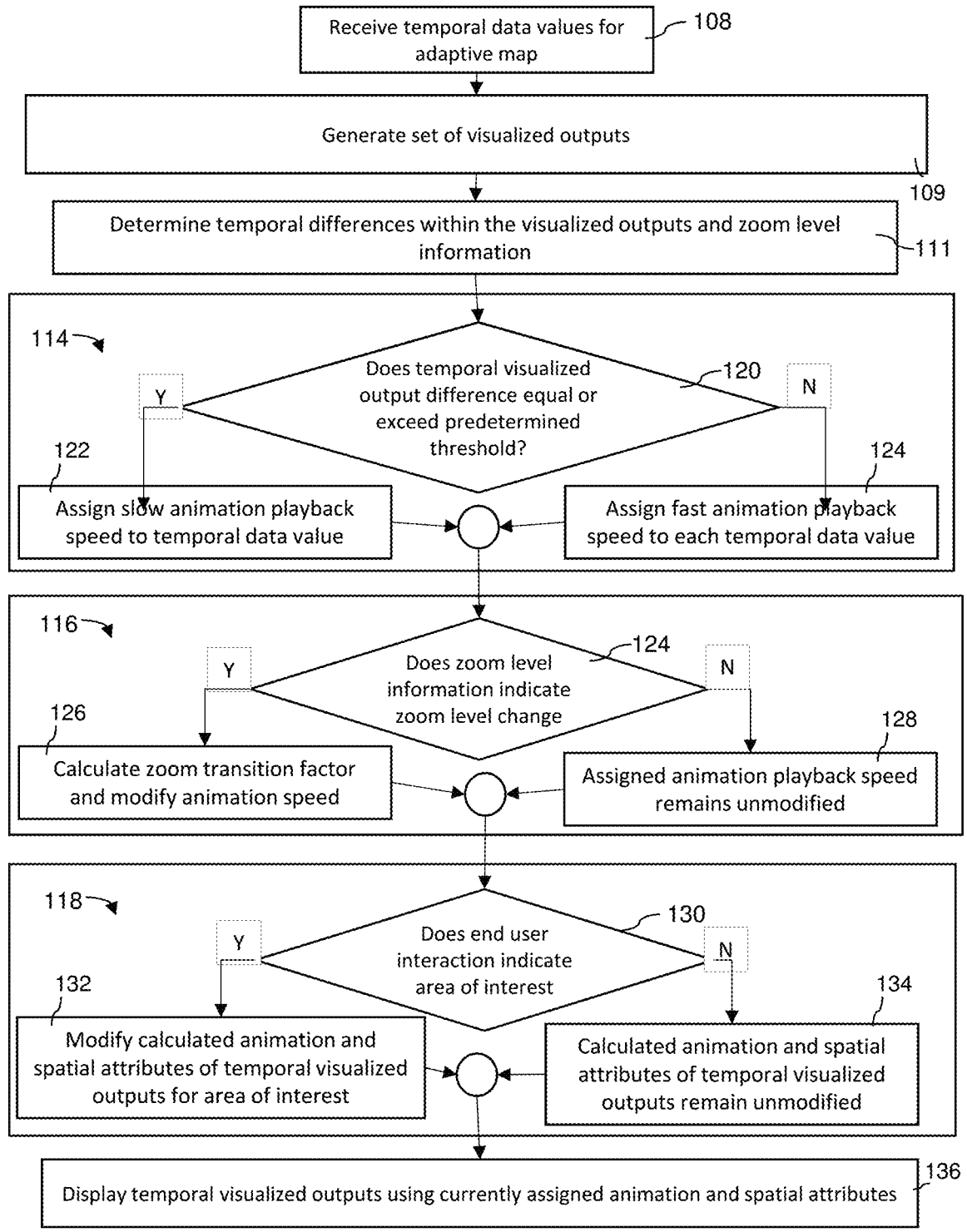
FIG. 2 is a flowchart illustrating a method, implemented using the system shown in FIG. 1, of optimization of animation speed and spatial aspects of visualized temporal data.

Now with combined reference to the Figures generally and with particular reference to FIGS. 1 and 2, an overview of a system 100 in which a method 200 for computer-implemented optimization of animation speed and spatial aspects of visualized temporal data is shown.

The server computer 102 receives, at block 108, a set of temporal data values to be visualized. It is noted that the data may include not only temporal data values to be visualized, but also accompanying information about temporal zoom levels and end-user interaction. The server computer 102 processes a set of temporal data value visualized outputs 110 and differences in those visualized outputs 112 in a visualized output processing module 114, compares visualized outputs and assigns animation speed, as will be described more fully below. The server computer 102, in zoom level information processing module 116, identifies zoom level changes and assigns temporal zoom transition factors, accordingly, as will be described more fully below. The server computer 102, in end user interaction animation speed assignment module 118, modifies temporal and spatial attributes of displayed data in accordance with user interaction, as will be described more fully below. The server computer 102, at block 136, shows visualized output corresponding to temporal data values at map display 106, at the animation speed, zoom level, and location determined to be appropriate according to aspects of the invention.

Now, with continued reference to FIG. 2, aspects of a method 200 for optimization of animation speed and spatial aspects of visualized temporal data will now be described in detail. At block 108, the server computer 102 receives a set of data to be visualized. The data set includes temporal data values and zoom level information (e.g., how much, and what portion, of the entire map is needed to visualize each temporal data value). At block 109, the server computer 102 assigns a visualized output attribute in accordance with aspects of the present invention. As shown in FIG. 4A, the visualized outputs may be colors or shapes that correspond to bins or groups of possible data values. In FIG. 4A, for example, the server computer 102 will group the values of the "Quantity" data column in table 400 into groups representing available colours (e.g., dark, medium, and light blue) or available shapes (e.g., triangle, circle, and square). Since the quantities of France and Italy are close, they will get assigned the same medium blue colour. For example, the "Quantity" characteristic of each temporal data value is assigned one of three available blue colors (e.g., dark, medium, and light as shown in FIG. 4A) for every year. The dark, medium and light blue colours are a dimension of the visualized output in this example. With continued reference to FIG. 2, the server computer 102, in block 109 assigns a visualized output characteristic such as a color, to different regions (e.g., France, Germany, Italy), as shown in table 400 of FIG. 4A. The server computer 102 may also overlay shapes (points, diamonds, triangles) of varying colors and sizes (see table 400) on top of certain locations (cities, counties, or zip codes). The visualized output is typically an aggregation or grouping of the data values as shown, for example, in table 402 of FIG. 4B, being visualized. It is noted that different (as well as more or fewer) colors and shapes may used in accordance with the judgment of one skilled in this art.

With reference again to FIG. 2, at block 111, the server computer 102 determines differences in the visualized output attributes assigned to each temporal data value. These determined differences are used in visualized output processing module 114 and zoom level information processing module 116 to adjust the temporal and visual scale of the displayed map, as described more fully below.

Issues with temporal data map animation arise because data visualized often does not change at a uniform pace; that is, the data change rate may be more significant in certain periods than others. This is especially true when the distinct count of the temporal column is high, and data changes vary greatly over time. This is problematic, because a map with varying rates of data change and a fixed animation pace may remain unchanged for long periods of time without any noticeable changes to the end user. When changes do occur on such a map, a user might not notice them, due to the map being incorrectly scaled or due to it changing the displayed content too quickly.

As shown in FIG. 2, the server computer 102 assesses, in the visualized output processing module 114, whether visualized output differences for given temporal values exceed a predetermined threshold and assigns a temporal data value animation speed accordingly. According to an embodiment, the threshold is a change from one color bin (e.g., light, medium, or dark blue) to another color bin (e.g., light, medium, or dark blue), although other threshold values could be used according to the judgment of those skilled in this art. Temporal differences in which color change occurs represent exceeding the threshold of change, and the server computer 102 at block 122, assigns a slow animation speed is assigned. However, if no color temporal change occurs, the server computer 102, assigns a faster temporal animation speed, at block 124. According to aspects of the invention, the first animation speed, assigned at block 122, is slower than the second animation speed, assigned at block 124. For example, if the first animation speed is 2 seconds per frame, the second animation speed is faster than 2 seconds per frame (e.g., 1 second per frame). The first and second animation speeds could be other values and are selected by a developer of known skill in this art to allow adequate time for a user to clearly see the changes present when the level of visualized differences are, respectively, above and below the threshold of change described herein.

The server computer 102 will analyze the changes in the visualized output in the map across temporal values and give a score to each change based on its significance as determined by significance information or significance factors. A shown in tables 300, 302 in FIG. 3 and FIG. 4, respectively, changes in numerical values are scored based on whether they result in a change in the visualized output. For example, if the value of quantity in Canada changes from 1 to 21, then that will result in a change in the region color from light blue to medium blue. This is a significant change and will have a higher score than a change in quantity in Germany from 62 to 82, since that will not result in any change in that region's color. In another example, changes in quantity are visualized in the size or color of a shape marker on the map (a point or diamond). Changes in quantity that result in a significant change in size or color are scored higher than those that do not result in any change at all. Changes in visualized output are also scored in relation to geographical data.

With reference to the data presented in the table shown in FIGS. 4A and 4B, when assigning a score to the change in visualized output, the server computer 102 will consider the significance of the change in relation to geography. Several factors are considered when scoring the significance of the change in relation to geography. One factor is the size of the region/location affected by the change. For example, if changes in quantity result in Canada going from light blue to medium blue for time t0, and changes in quantity result in Puerto Rico going from light blue to medium blue for time t1, then the change at time t0 will have a higher score than the change at time t1, despite the changes in color being identical, since Canada has a much larger area than Puerto Rico, and thus the change will be of more significance to the end user. As shown in FIGS. 3A and 3B, another factor considered is whether the change resulted in the addition or removal of regions or locations. For example, if changes in quantity at t2 resulted in the addition of a new country, India, to the map, then that change will have a higher score than a change at t1 that resulted in changes in color for Italy. Another factor considered is whether a change results in the addition or removal of a region/location, the server computer 102 will assign a higher score for changes that affect the zoom level. For example, if a dataset has all its geographical data in Europe, and the zoom level is set to show all of Europe, and then at t3, China is added as a region, then the score of that change is higher than an addition of another European country since the addition of China will result in a change in the map's zoom level. Still another factor considered is the number of regions/locations visualized on the map. For example, if data is visualized in points at locations (cities), and the map shows quantity for cities in Europe, then the server computer 102 will assign a higher score for a change at t4 that resulted in the addition of 1 city to an already visualized list of 3 cities, than a change at t10 that resulted in the addition of 1 city to a visualized list of 100 cities on a map. The addition of 1 city is more detectable by the end user when there are only 3 other cities on the map, then when there are a 100.

The server computer 102, will account for a combination of factors when scoring the significance of the change in relation to geography. For example, the addition of a small country (e.g., Luxemburg at t5) would be scored lower than a change in color for a large country (Russia at t6), since the latter change is more detectable by the end user (Russia has a much larger area when compared to Luxemburg).

The server computer 102 will adjust the temporal scale (animation speed) to give more time for changes with a high significance score and less time for changes with a low significance. Temporal values that do not result in a significant detectable change to the end user will result in the map animating faster for those values, whereas temporal values that result in significant detectable change to the end user will result in the map animating slower for those values. For example, if the quantity for Germany for the next year increases from 61 to 62, the map will continue to apply the same dark blue color. Since there was no significant detectable user change, the map may animate faster during that temporal value. See Table 2 for a complete example. The server computer 102 will consider all changes in the visualized output to provide the best overall animation sequence for the temporal scale.

As shown in FIG. 2, the server computer 102 assesses, in block 124 of the zoom level information processing module 116, whether visualized output differences for given temporal values require a zoom level change. According to an embodiment, a zoom level change can be required when regions not currently included in portions of a map at one temporal value are required in order to be displayed at a subsequent temporal value. When zoom level changes are required, the server computer 102, modifies the assigned animation speed at block 126, to accommodate a smooth visual transition to include the needed, but not shown, map regions over a period determined by the server computer 102 as described below. If no zoom level change is required, the server computer 102, maintains the assigned animation speed at block 126 then the assigned animation speed is not modified. According to aspects of the invention, changes in the visualization output that require updating the zoom level will be programed into the timeline to facilitate smoother transitions. The server computer 102 will adjust the time allocated for each temporal value to allow for a smooth transitioning from one zoom level to another.

As shown in FIG. 2, the server computer 102 assesses, in block 130 of end user interaction assessment module 118, whether user interaction provides an indication of an area of interest. When, as described below, user interaction indicates an area of preference, the server computer 102, at block 132, modifies the spatial and temporal attributes of visualized outputs to maintain the area of interest on the map display 106. If no area of interest is identified by user interaction, the server computer 102, at block 134, maintains animation and spatial attributes of temporal visualized outputs as calculated.

In particular, during playback animation, an end user interacts with the map to either pause, rewind, or fast forward the timeline, or to change the zoom level. The server computer 102, in end user interaction assessment module 118 will learn from these actions about the user's areas and time of interest, and then adjust the programming of the timeline and zoom level accordingly. In one embodiment, if the user zooms into a specific zoom level, the end user interaction assessment module 118 will deem this an area of interest will then opt to not zoom out from this zoom level even if other changes happen that are not visible on the map. The end user interaction assessment module 118 will also adjust the timeline scale to focus on the area of interest similarly to what was described in previous steps. For example, if the user adjusts the zoom level so that Germany is visible at the provincial/state level, the server computer 102 will not zoom out to a level exceeding since after that level, Germany's provinces/states will no longer be visible. In another embodiment, if the user rewinds a specific period of the timeline, the end user interaction assessment module server computer 102 will consider that period to be a time of interest to the end user and will adjust the timeline scale to run slower for the user's period of interest. For example, if the user repeatedly rewinds the period of the timeline between 2017-2019, the server computer 102 will consider that period to be a time of interest to the end user and will double the time spent in those temporal values. Other user interactions may also indicate areas of interest, and such other interactions may be selected by one skilled in this art.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
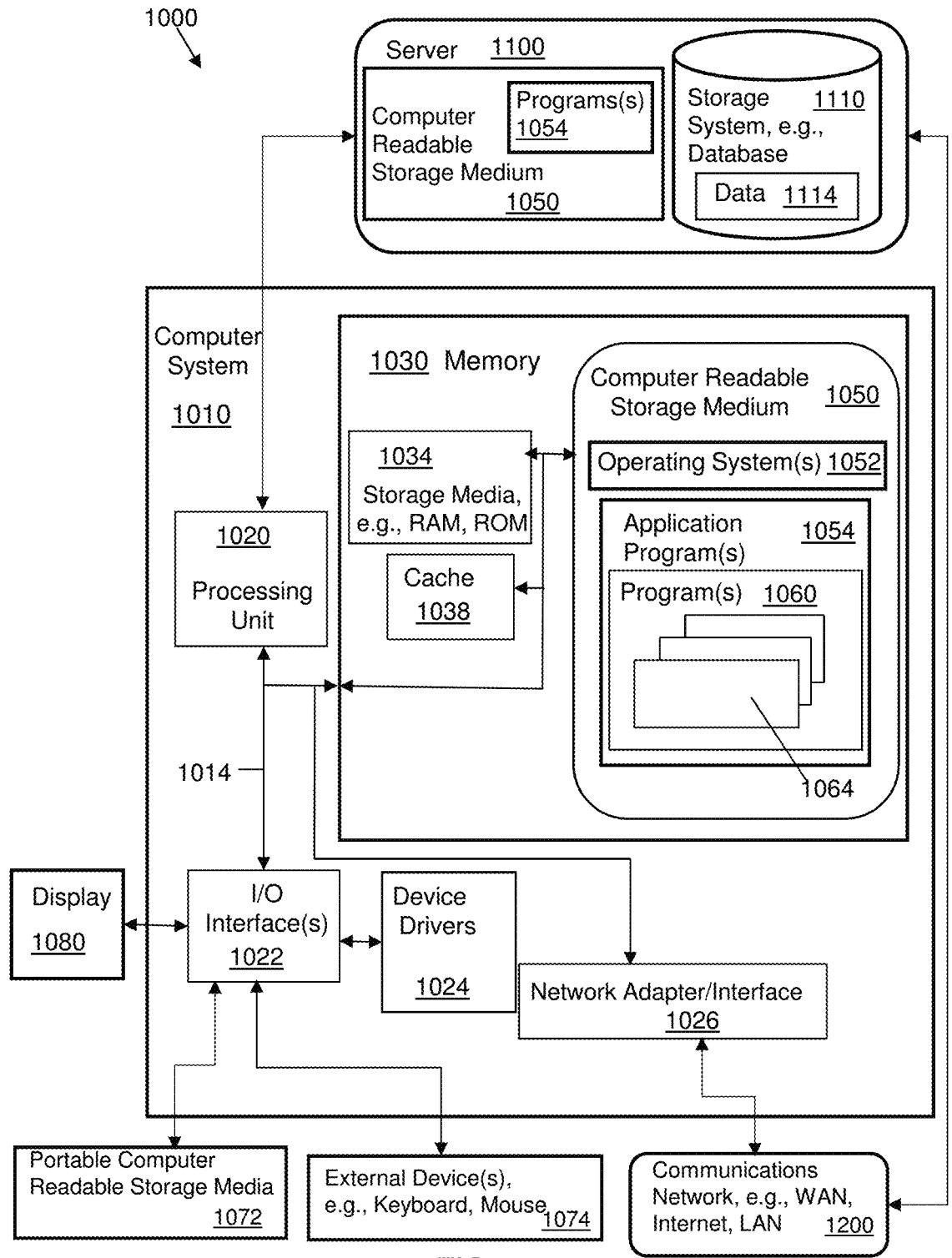
FIG. 5 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 5, a system or computer environment 1000 includes a computer diagram 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media.

Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 (shown in FIG. 8) can include all or part of the computer system 1010 and its components, and/or the control system can communicate with all or part of the computer system 1010 and its components as a remote computer system, to achieve the control system functions described in the present disclosure. It is also understood that the one or more communication devices 110 shown in FIG. 1 similarly can include all or part of the computer system 1010 and its components, and/or the communication devices can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
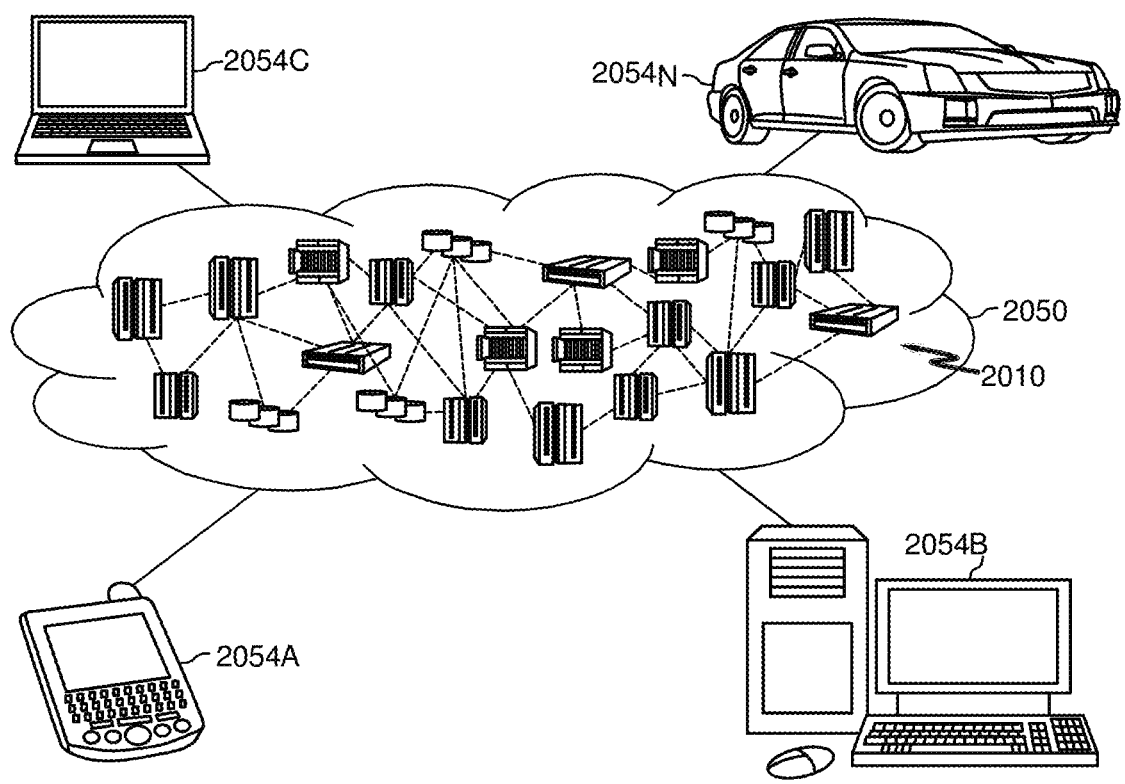
FIG. 6 depicts a cloud computing environment according to an embodiment of the present invention.

Referring now to FIG. 6, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 6 are intended to be illustrative only and that computing nodes 2010 and cloud computing environment 2050 can communicate with any type of computerized device over any type of network and/or network addressable connection (e.g., using a web browser).

Figure 7:
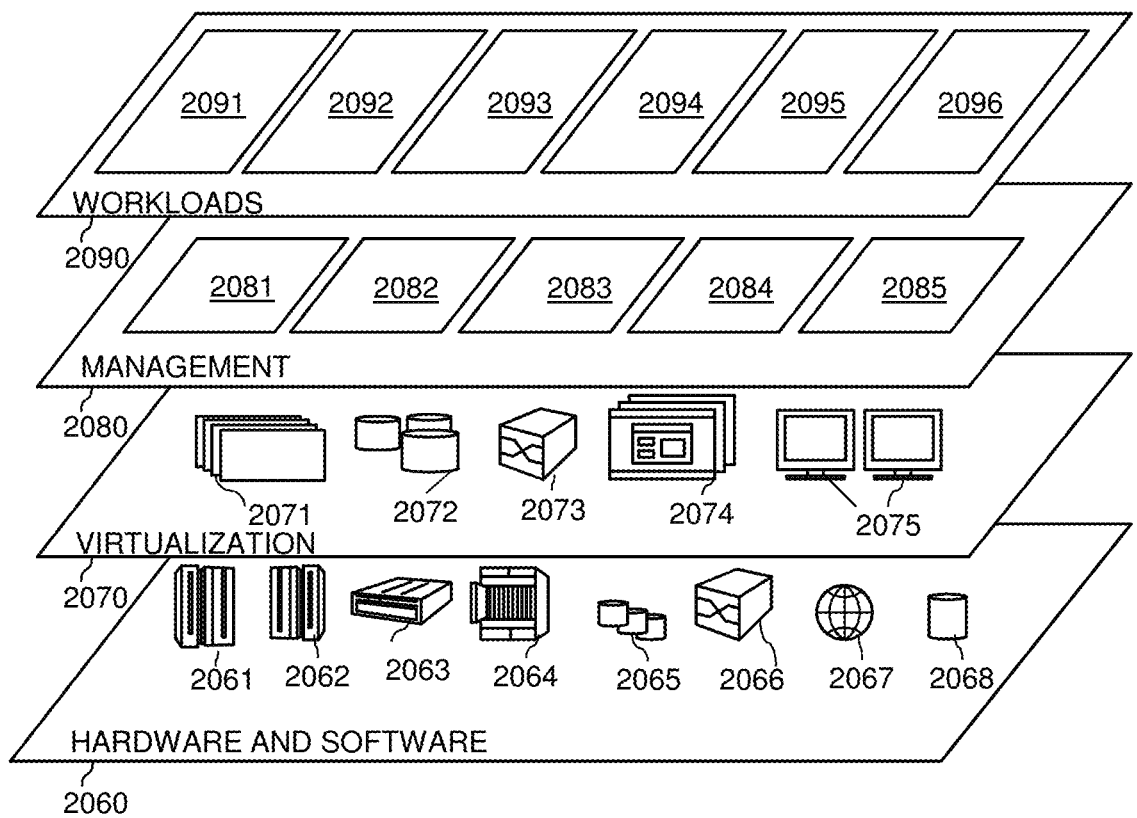
FIG. 7 depicts abstraction model layers according to an embodiment of the present invention.

Referring now to FIG. 7, a set of functional abstraction layers provided by cloud computing environment 2050 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and optimizing animation speed and spatial aspects of visualized temporal data 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating an adaptive map for visualizing data with temporal relationships, the method comprising:
   receiving, by a computer, data comprising temporal data values;
   assigning to each temporal data value, by said computer, one of a plurality of visual attributes that corresponds to said temporal data value, thereby generating a set of temporal visualized outputs;
   determining, by said computer, temporal differences in said set of temporal visualized outputs;
   assigning, by said computer, responsive to said calculation of temporal differences, a temporal animation playback speed to each of said temporal data values, wherein said temporal animation playback speed is based, at least in part, on whether said temporal difference exceeds a predetermined change threshold; and
   displaying, by said computer, said temporal visualized outputs at said corresponding animation playback speeds on a map display.

2. The computer-implemented method of claim 1, wherein:
   said temporal data values further include temporal zoom level information;
   responsive to a determination by said computer, that said temporal differences include a zoom level change, calculating by said computer, a temporal zoom transition factor; and
   modifying said temporal animation playback speed in accordance with said temporal zoom transition factor.

3. The computer-implemented method of claim 1, wherein:
   responsive to said temporal difference equaling or exceeding a predetermined change threshold, said temporal animation playback speed is a first speed.

4. The computer-implemented method of claim 3, wherein:
   responsive to said temporal difference falling below a predetermined change threshold, said temporal animation playback speed is a second speed, said second speed being faster than said first speed.

5. The computer-implemented method of claim 1, further comprising:
   in response to receiving, by the computer, an interest-indicating interaction of a user, adjusting by the computer, a temporal scale in accordance with the interaction to focus on a period of interest indicated by the interaction.

6. The computer-implemented method of claim 1, further comprising:
   in response to receiving, by the computer, an interest-indicating interaction of a user, adjusting by the computer, a spatial scale in accordance with the interaction to focus on an area of interest indicated by the interaction.

7. The computer-implemented method of claim 6, wherein said interest-indicating interaction is selected from the group consisting of a change in zoom level and a change in centroid of area represented by the map.

8. The computer-implemented method of claim 1, wherein:
   said data includes location significance information associated with each temporal data value; and
   modifying said animation speed in accordance with said location significance information.

9. A system to generate an adaptive map for visualizing data with temporal relationships, which comprises:
   a computer system comprising a computer readable storage medium having program instructions embodied therewith, the program instructions executable by a computer to cause the computer to:
   receive data comprising temporal data values;
   assign to each temporal data value one of a plurality of visual attributes that corresponds to said temporal data value, thereby generating a set of temporal visualized outputs;
   determine temporal differences in said set of temporal visualized outputs;
   assign, responsive to said calculation of temporal differences, a temporal animation playback speed to each of said temporal data values, wherein said temporal animation playback speed is based, at least in part, on whether said temporal difference exceeds a predetermined change threshold; and
   display said temporal visualized outputs at said corresponding animation playback speeds on a map display.

10. The system of claim 9, wherein:
    responsive to said temporal difference equaling or exceeding a predetermined change threshold, said temporal animation playback speed is a first speed.

11. The system of claim 10, wherein:
responsive to said temporal difference falling below a predetermined change threshold, said temporal animation playback speed is a second speed, said second speed being faster than said first speed.

12. The system of claim 9, wherein:
said temporal data values further include temporal zoom level information, and wherein the program instructions further cause the computer to:
responsive to a determination that said temporal differences include a zoom level change, calculate a temporal zoom transition factor; and
modify said temporal animation playback speed in accordance with said temporal zoom transition factor.

13. The system of claim 9, further comprising program instructions causing the computer to:
in response to receiving an interest-indicating interaction of a user, adjust a temporal scale in accordance with the interaction to focus on an area of interest indicated by the interaction.

14. The system of claim 9, further comprising program instructions causing the computer to:
in response to receiving an interest-indicating interaction of a user, adjust a spatial scale in accordance with the interaction to focus on an area of interest indicated by the interaction.

15. The system of claim 9, wherein:
said data includes location significance information associated with each temporal data value; and
wherein said program instructions further cause the computer to modify said animation speed in accordance with said location significance information.

16. A computer program product embodied on a non-transitory computer readable storage media to generate an adaptive map for visualizing data with temporal relationships, the computer program product comprising a computer readable storage medium having program instructions embodied therewith, the program instructions executable by a computer to cause the computer to:
receive, using the computer, data comprising temporal data values;
assign, using the computer, to each temporal data value one of a plurality of visual attributes that corresponds to said temporal data value, thereby generating a set of temporal visualized outputs;
determine, using the computer, temporal differences in said set of temporal visualized outputs;
assign, using the computer, responsive to said calculation of temporal differences, a temporal animation playback speed to each of said temporal data values, wherein said temporal animation playback speed is based, at least in part, on whether said temporal difference exceeds a predetermined change threshold; and
display, using the computer, said temporal visualized outputs at said corresponding animation playback speeds on a map display.

17. The computer program product of claim 16, wherein:
said temporal data values further include temporal zoom level information, and wherein the program instructions further cause the computer to:
responsive to a determination that said temporal differences include a zoom level change, calculate a temporal zoom transition factor; and
modify, using the computer, said temporal animation playback speed in accordance with said temporal zoom transition factor.

18. The computer program product of claim 16, further comprising program instructions causing the computer to:
in response to receiving an interest-indicating interaction of a user, adjust using the computer, a temporal scale in accordance with the interaction to focus on an area of interest indicated by the interaction.

19. The computer program product of claim 16, further comprising program instructions causing the computer to:
in response to receiving an interest-indicating interaction of a user, adjust using the computer, a spatial scale in accordance with the interaction to focus on an area of interest indicated by the interaction.

20. The computer program product of claim 16, wherein:
said data includes location significance information associated with each temporal data value; and
wherein said program instructions further cause the computer to modify, using the computer, said animation speed in accordance with said location significance information.

\* \* \* \* \*